SYSTEM FOR FACSIMILE TRANSMISSION OVER TELEPHONE LINES

Original Filed May 26, 1965 3 Sheets-Sheet 1

INVENTORS.
REX J. CROOKSHANKS
GLENN A. REESE
By Smyth, Roston & Pavitt
ATTORNEYS.

SYSTEM FOR FACSIMILE TRANSMISSION OVER TELEPHONE LINES

Original Filed May 26, 1965

INVENTORS.
REX J. CROOKSHANKS
GLENN A. REESE
BY Smyth, Roston & Pavitt
ATTORNEYS.

SYSTEM FOR FACSIMILE TRANSMISSION OVER TELEPHONE LINES

INVENTORS.
REX J. CROOKSHANKS
GLENN A. REESE
BY Smyth, Roston & Pavitt
ATTORNEYS.

United States Patent Office 3,496,298

Patented Feb. 17, 1970

3,496,298

SYSTEM FOR FACSIMILE TRANSMISSION OVER TELEPHONE LINES

Rex J. Crookshanks, Palos Verdes Estates, and Glenn A. Reese, San Pedro, Calif., assignors to The Magnavox Company, Torrance, Calif., a corporation of Delaware Continuation of application Ser. No. 458,954, May 26, 1965. This application Feb. 24, 1969, Ser. No. 805,970
Int. Cl. H04m 11/06
U.S. Cl. 179—4 17 Claims This is a continuation of application Ser. No. 458,954 (now abandoned) filed May 26, 1965 on behalf of Rex J. Crookshanks and Glenn A. Reese and entitled "Facsimile Transmission System."

The present invention relates to facsimile means and more particularly to means for transmitting video signals in a facsimile system from a transmitting unit to a receiving unit in the system and to means for synchronizing the operation of the receiving unit with the operation of the transmitting unit.

At the present time, there are a large number of facsimile systems that are capable of transmitting video signals over a considerable distance for producing a facsimile of an original document. To obtain a faithful reproduction of the original, it is essential for the received signals to be a faithful reproduction of the original transmitted signals. It is also essential that the operation of the receiving unit be accurately synchronized with the operation of the transmitting unit. If the means of transmission are of a wide-band nature, it is possible to transmit and receive a wide-band video signal that is a faithful reproduction of the original signal. It is also convenient to simultaneously transmit and receive various synchronizing signals that are effective to lock the receiving unit to the transmitting unit.

When the facsimile system is adapted to transmit over a narrow-band medium, it is difficult to make an effective transmission of a video signal even without the synchronizing signals. A facsimile system of this nature is disclosed and claimed in application Ser. No. 669,315 filed Sept. 20, 1967 on behalf of Glenn A. Reese and Paul J. Crane entitled "Facsimile Systems," which in turn is a continuation of application Ser. No. 549,759 (now abandoned) filed April 21, 1966 and entitled "Facsimile Systems," which in turn is a continuation of application Ser. No. 176,248 (now abandoned) filed Feb. 28, 1962 and entitled "Facsimile Systems" and assigned of record to The Magnavox Company. The system provides a transceiver that is particularly adapted to operate in a transmit mode so as to scan a document such as a letter, drawing, blueprint, etc. and produce at an audio frequency video signals representing the contents of the document. These video signals are then coupled onto a conventional telephone line of the type presently commercially available for ordinary telephone conversations. A second transceiver adapted to operate in a receive mode has a printing transducer that scans a blank piece of copy paper and prints thereon in response to the video signals so as to reproduce a facsimile of the original document.

Such a system is effective to produce facsimiles of the document. However, it has been found that long distance telephone transmission lines have various characterstics such as a very narrow passband as well as distortion such as phase, amplitude, etc. that interfere with the efficient transmission of the video signals and also of adequate synchronizing signals at the audio frequencies.

The present invention provides means for overcoming the foregoing difficulties. More particularly, means are provided for faithfully transmitting a combination of video or facsimile signals and synchronizing signals over a narrow-band telephone transmission line such as a long distance telephone line. Applicants' system is also advantageous in that it operates to transmit the facsimile information, receive such information and reproduce the facsimile information at the receiver while using acoustical couplers to introduce the information from the transmitter into the telephone lines and to introduce such information from the telephone lines into the receiver.

In one operative embodiment, this is accomplished by providing a facsimile transceiver having pickup means for scanning a document and producing a baseband video signal at audio frequencies. A frequency modulation system frequency modulates the baseband signal onto a carrier wave which is within the passband of conventional telephones and telephone transmission lines. The frequency modulated signal is then introduced to an acoustical coupler which couples the signal into the telephone lines. The signals are then transmitted through the telephone lines to the receiver where they are passed through a second acoustical coupler from the telephone lines into the receiver. The receiver also includes printing means for scanning a blank copy paper together with a frequency demodulator which is effective to demodulate the carrier wave and feed the baseband signal to the printing means so as to print on the copy paper and produce a copy of the original document. In addition, the frequency modulation system includes means at the transmitter for amplitude modulating synchronizing signals onto the frequency modulated carrier wave and means at the receiver for receiving the synchronizing signals and synchronizing the operation of the receiving unit with the transmitting unit.

To facilitate the operation of the receiver in receiving the facsimile signals from the acoustical coupler after the signals have passed through the telephone lines, means are provided at the receiver for enhancing the operation of the receiver with respect to such signals. Such means are effective to emphasize the facsimile signals after the passage of the signals through the acoustical coupler and to de-emphasize all other signals in comparison to the facsimilie signals. By emphasizing the facsimile signals and de-emphasizing all other signals, the picture reproduced at the receiver constitutes a faithful reproduction of the picture viewed at the transmitter. Such faithful reproduction of the picture is obtained at the receiver in spite of any tendency for the acoustical coupler to introduce extraneous noise into the receiver from the vicinity surrounding the acoustical coupler and in spite of any tendency of the telephone lines to mix the facsimile signals with other signals transmitted through the lines.

These and other features and advantages of the present invention will become readily apparent from the following detailed description of a limited number of operative embodiments thereof particularly when taken in connection with the accompanying drawings wherein like reference numerals refer to like parts and wherein.

Figure 1:
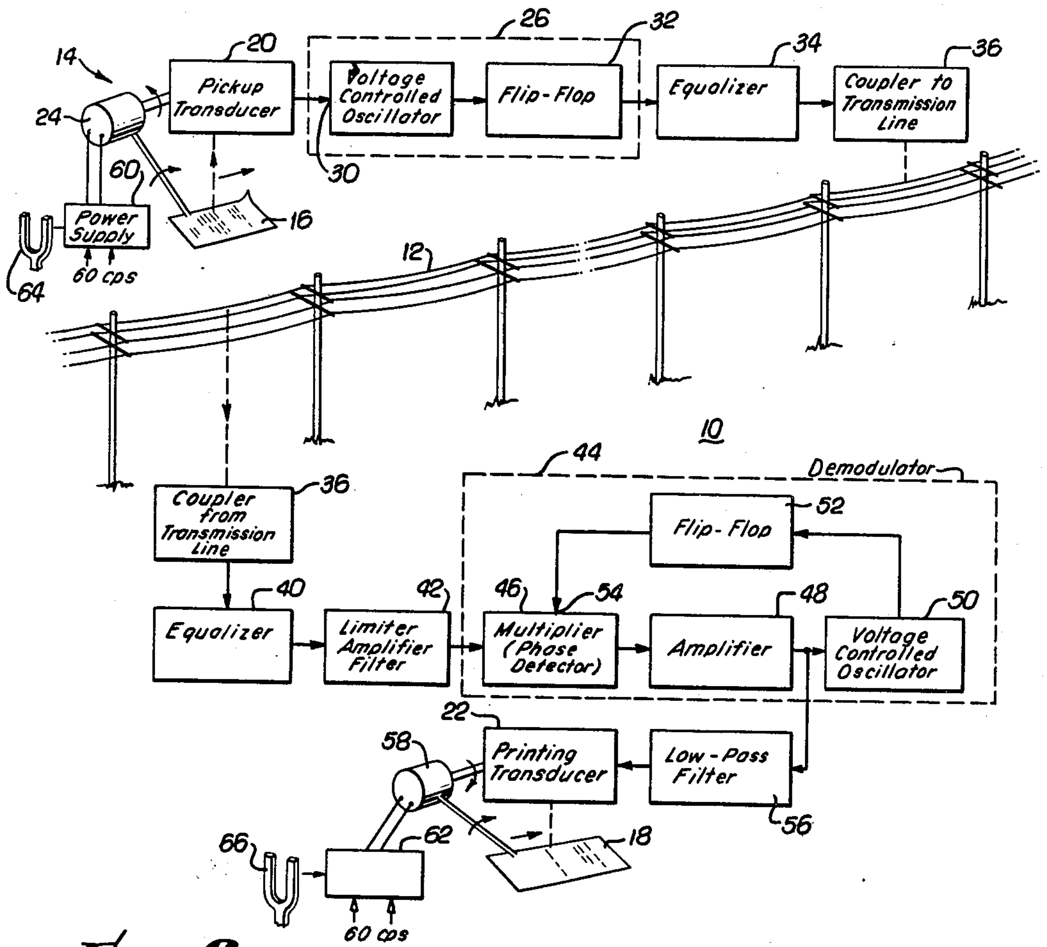
FIGURE 1 is a block diagram of one embodiment of the invention.

Referring to the drawings in more detail and particularly to the embodiment in FIGURE 1, the present invention is particularly adapted to be embodied in a facsimile system 10 for transmitting video or facsimile signals over a conventional long distance telephone transmission line 12 for producing a copy of an original document 16.

The system 10 employs a transceiver 14 which may be operated in a transmit mode for scanning a document and generating video signals corresponding to the document and then transmitting the signals over the telephone transmission line 12. Alternatively, the transceiver may be operated in a receive mode for receiving the video signals from the telephone transmission line 12 and reproducing a copy of the original document.

By way of example, the transceiver 14 may be substantially identical to that disclosed and claimed in copending applications Ser. No. 669,315 filed Sept. 20, 1967 in the names of Glenn A. Reese and Paul J. Crane and Ser. No. 494,053, filed Oct. 8, 1965, in the names of Glenn A. Reese and Gustavus B. Pearson and both assigned of record to The Magnavox Company.

Such a transceiver includes a device such as a semi-cylindrical platen that may hold the original document 16 or a blank piece of copy paper 18 and feed it axially therealong during the reproduction operation. The transceiver 14 also includes one or more pickup transducers 20 for scanning the original document 16 and one or more printing transducers 22 (or other reproducing means) for scanning the blank piece of copy paper 18.

The pickup transducer 20 (or other reading means) may be of any type capable of scanning the original document 16 and producing a baseband signal. However, it has been found that a photo-electrical cell and related optical system such as disclosed and claimed in application Ser. No. 655,261 filed June 28, 1967 entitled "Optical Facsimile Scanning System," which in turn is a continuation-in-part of application Ser. No. 436,504 (now abandoned) filed Mar. 2, 1965 and entitled "Optical System" in the names of Glenn A. Reese and Gustavus B. Pearson and assigned of record to The Magnavox Company is particularly well suited for this purpose. In this system, the photo-electric cell and/or document are driven by a synchronous motor 24 so as to scan successive lines across the document. A lamp produces a bright spot in the field of view of the photo-cell whereby the photo-cell will produce a baseband signal having an amplitude corresponding to the amount of reflectivity of the original document 16.

By way of example, at a point where the document 16 is white or has large amounts of reflections, the amplitude of the signal may be zero. However, at a point where the document 16 is dark or has a small amount of reflectivity, the amplitude of the signal may be large, for example, approximately 7 volts. It will be seen that when the original document 18 is a typewritten or similar document, the output signal will be a series of square wave pulses varying between zero and the maximum level. In the event that the document 16 includes half-tones, the signal will tend to vary continuously between zero and 7 volts.

The output of the pickup transducer 20 is interconnected with the input to a flip-flop 32. This flip-flop 32 may be of a conventional design and is effective to reverse its state each time that the potential on the input rises above a particular level. This level is set below the peak of the signal from the oscillator whereby the flip-flop 32 will reverse its state once each cycle. The flip-flop 32 thus runs at one-half of the rate at which the oscillator 28 is running. This will reduce the frequency of the carrier wave into a region of about 750 c.p.s. to about 1250 c.p.s.

The combination of the voltage controlled oscillator 28 and flip-flop 32 act as a frequency modulator that insures a symmetrical frequency modulated signal. It should be understood that any frequency modulation technique capable of producing such a signal may be used instead of the present arrangement.

The output of the flip-flop 32 may be interconnected with an equalizer 34. The characteristics of this equalizer 34 are chosen so as to correspond to the characteristics of the long distance telephone transmission line 12 and related equipment such as a telephone of the type presently commercially available for ordinary telephone conversations. It has been found that the commercially available telephone transmission lines and related equipment have certain characteristics which produce large amounts of distortions such as amplitude, phase, etc. These distortions become progressively larger as the frequency increases and especially above about 2500 c.p.s. This form of distortion is not a serious disadvantage for audio signals such as in an ordinary conversation. However, they do have a seriously adverse effect on video signals. This equalizer 34 is effective to modify the frequency modulated signal so as to at least partially compensate for the characteristics of the transmission lines 12.

The output from the equalizer 34 is interconnected with a coupler 36 (or other sending means) for coupling the signal onto the transmission line 12. Although this may be of any suitable variety, it has been found desirable to employ some form of acoustical coupling which will couple directly into the handset of a conventional telephone. Alternatively, the coupler may be connected directly to a so-called Data-phone whereby the frequency modulated video signals will be coupled directly onto the transmission line 12.

When operating in a receive mode, the unit may employ a coupler 36 substantially identical to the preceding coupler 36 for removing the frequency modulated carrier from the transmission line 12. The output of the coupler 36 is interconnected with the input to an equalizer 40. This equalizer 40 may be similar to or identical with the equalizer 34 in the transmitter. The two equalizers 34 and 40 complement each other and substantially completely compensate for any distortions that may be produced by transmission over the telephone lines 12.

The output of the equalizer 40 is interconnected with the input to a limiter-amplifier-filter 42. This circuit 42 is effective to limit the amplitude of the equalized signal to a substantially uniform level and thereby eliminate any amplitude modulation that may have been superimposed on the carrier as a result of noise, etc. It is also effective to amplify the limited signal and restore its magnitude to a more useful level.

In addition, the circuit 42 is adapted to filter the signal and restore the various sidebands, particularly the upper sidebands. It has been found that during transmission by means of a telephone line and particularly long distance telephone lines, there is a severe "roll-off" beginning in the region of about 2500 c.p.s. This "roll-off" is effective to virtually eliminate the upper sidebands from the transmitted signal. In order to obtain a more faithful reproduction, it has been found that the upper sideband should be restored prior to demodulation.

The output of the limiter-amplifier-filter 42 is interconnected with a suitable frequency demodulator 44. The demodulator includes a multiplier or detector 46 that will produce a baseband signal substantially identical to the baseband signal from the pickup transducer 20. The output of the phase detector 46 is interconnected with an amplifier 48 that increases the magnitude of the baseband signal to a more useful level.

A first branch of the output from the amplifier 48 is connected to the input to a voltage controlled oscillator 50. Preferably, this oscillator 50 is substantially identical to the voltage controlled oscillator 28 in the transmitter. This will insure the two oscillators 28 and 50 operating in substantially identical manners and will eliminate the necessity for matching the characteristics of two different types of oscillators.

The signal from the voltage controlled oscillator 50 has a frequency that is a function of the amplitude of the baseband signal on its input. The output of the voltage controlled oscillator is, in turn, interconnected with a flip-flop 52 so as to supply the oscillations thereto. The flip-flop 52 reverses its state once during each cycle. This will produce a symmetrical signal of half-frequency.

The output of the flip-flop 52 is interconnected with a second input 52 to the multiplier phase detector 46. It may be seen that this will form a phase-locked loop that maintains the detected signal synchronized with the original signal.

The second branch of the output from the amplifier 48 is connected to a suitable low-pass filter 56. This filter 56 is effective to eliminate the high frequency signals and pass only those signals having frequencies in the range of the original baseband signal.

The printing transducer 22 is electrically connected to the low-pass filter 56 so as to receive the baseband signal. The transducer 22 is effective to scan the blank piece of copy paper 18 and to print thereon in response to the baseband signal.

Although the transducer 22 may be of any desired variety, it has been found desirable to employ a transducer similar to that disclosed in the aforementioned copending application Ser. No. 494,053. This transducer includes a stylus that rides on a pressure-sensitive writing material like carbon paper and produces the desired mark on the paper in proportion to the amplitude of the signal.

To produce a scanning action, the printing transducer 22 may be driven relative to the paper by means of a drive motor 58. The drive motor 58 is preferably a synchronous motor substantially identical to the motor 24 in the transmitting unit. The frequency of the power supplied to the motors 58 will control the speed at which they run and the rate at which the scanning progresses.

Although the commercially available power in most areas of the country are close to the standard c.p.s., there are some variations between the various power grids. As a result, the two motors 24 and 58 will not necessarily run at the same speeds if they are driven from the standard power sources. To overcome this difficulty, each transceiver may include a power supply 60 or 62 controlled by a tuning fork 64 or 66. Each of the tuning forks 64 and 66 are carefully selected to have a resonant frequency that is precisely equal to some preselected standard. This will be effective to insure the power supplies 60 and 62 operating at the same frequencies and the motors running at identical speeds.

It will thus be seen that a facsimile system has been provided which is effective to scan the document 16 which is to be duplicated and produce a baseband signal which is a function of the material on the document 16. This baseband signal will then be effective to actuate a frequency modulation system so as to produce a symmetrical frequency modulated signal having a frequency in the range of about 750 to about 1250 cycles. This signal is then equalized and supplied to a telephone transmission line 12.

The transmitted signal is then received and decoupled from the transmission line and again equalized and filtered to restore the upper sidebands to their proper levels. The restored signal is then frequency demodulated by means of a phase-locked loop and filtered to provide the original baseband signal. This baseband signal is then effective to drive a printing transducer 22 whereby a facsimile of the original document 16 will be produced at the receiving station.

The output from the equalizer 34 is fed to an acoustical coupler 36, the purpose of which is to transduce the electrical signal into an acoustical signal and thereafter to transfer the acoustical signal into a standard telephone handset for transmission on the lines 12. The effectiveness of the acoustical coupler 36 is of critical importance in a practice of facsimile transmission over commercial telephone lines; if the print-out of the facsimile system is to be reasonably similar to the copy originally read by the pickup transducer 20, the acoustical coupler must minimize the effects of the following disturbances: (1) room noise, (2) spurious vibration and (3) transmission line echo and distortion. The acoustical coupler 36 which is featured in the instant invention is two-way in its capabilities: it can either transduce and couple electrical signals into a telephone handset or receive acoustical signals from the telephone handset and convert them back into electrical signals for use in the print-out mode of the facsimile system.

Figures 4, 5, 6, 7, 8, 9:
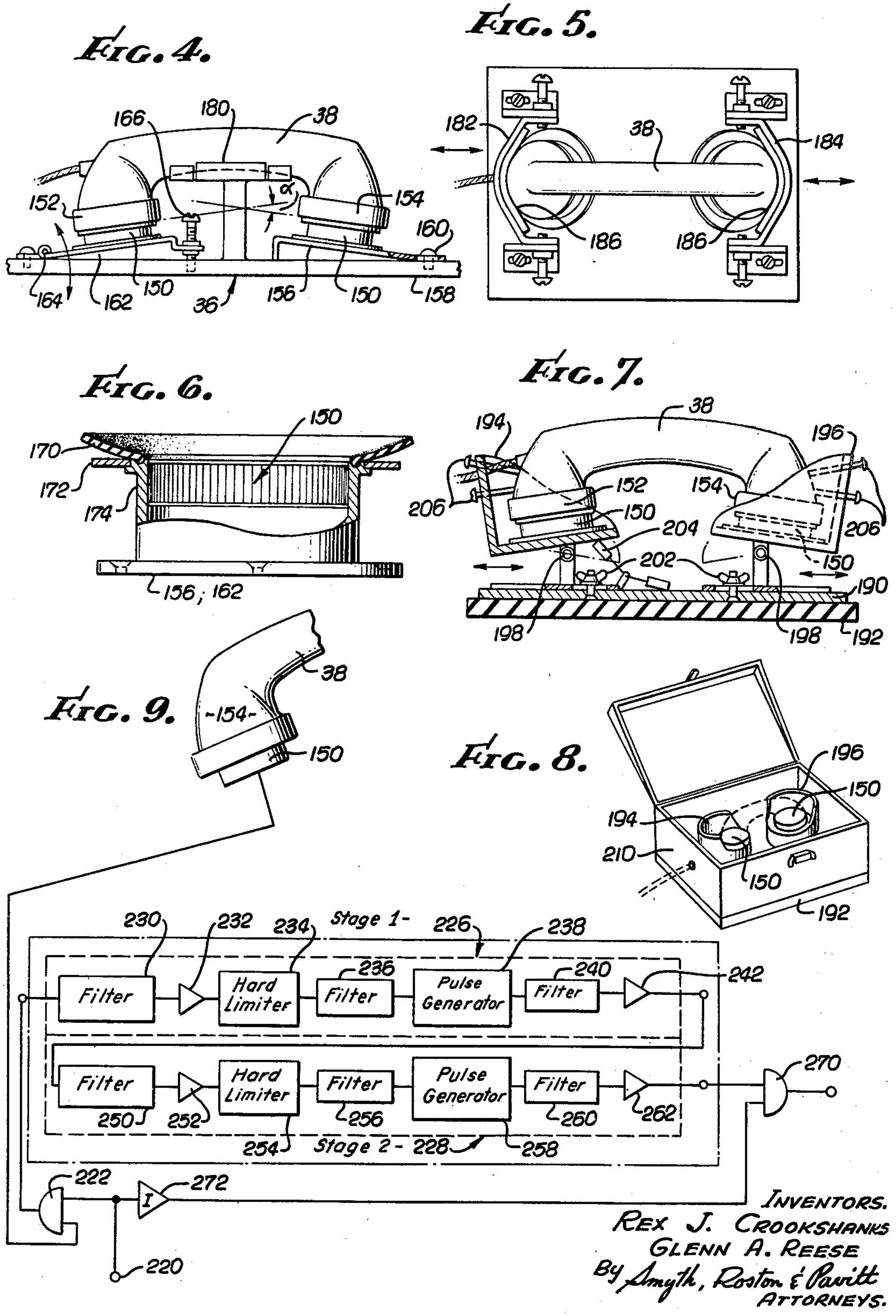
FIGURE 4 is a side elevation of an acoustical coupler according to one feature of the invention.
FIGURE 5 is a plan elevation of the acoustical coupler of FIGURE 4.
FIGURE 6 is a detailed side elevation of an electrical-acoustical transducer of the acoustical coupler of FIGURE 4.
FIGURE 7 is a side elevation of a second acoustical coupler according to the features of the invention.
FIGURE 8 is a plan elevation of a third acoustical coupler according to the invention.
FIGURE 9 is a block diagram of the print-out or receive mode of the acoustical coupler electrical system.

Referring to FIGURE 4, the acoustical coupler 36 include transducers 150, which exchange acoustical signals with a standard commercial telephone handset 38. Individual telephone handsets vary somewhat in the following particulars regarding their speaking and listening transducers 152 and 154, respectively: (1) the distance between the centers of the circular faces of the transducers 152 and 154, (2) the difference in the angle $\alpha$ between the planes of the faces of the transducers 152 and 154 (between 11° and 19°, usually), and (3) differences in diameter of the circular faces of the transducers 152 and 154. The acoustical coupler of FIGURE 4 is designed to accommodate or be adjustable to all three types of variation. Distance variation between centers of the circular faces of the transducers 152 and 154 is met by making a first bearing plate 156 of one of the transducers 150 slidable in a base plate 158 of the acoustical coupler 36. A lock screw 160 may be used to hold a slidable plate 156 in place once it has been adjusted to accommodate a specific handset 38. The difference in the angle $\alpha$ between the planes of the transducers 152 and 154 is adjusted to by varying the tilt of a second mounting plate 162 of one of the transducers 150. This may be accomplished by hinging the mounting plate 162 to the base plate 158 as at 164 and using an elevating screw 166 at the unhinged end of the mounting plate 162.

Referring to FIGURE 6, the varying diameters of the circular faces of the transducers 152 and 154 are accommodated by surrounding each transducer 150 with a rubber washer 170, preferably of concave shape, and having a backup washer 172. In order to make fine adjustments to variation in the angle $\alpha$ between the transducers 152 and 154, the transducer 150 may be borne on its mounting plate 156 or 162 by a sponge cylinder 174. Such a resilient mounting has the added advantage of providing additional insulation of the base transducer 150 from vibration disturbances coming through the base 158 of the acoustical coupler.

In order to hold the handset transducers 152 and 154 in an exact relationship with the transducer 150, it is necessary to use an adjustable cradle as shown in FIGURE 4, 180, or horseshoes as shown in FIGURE 5, 182 and 184, to hold the handset 38 in proper orientation. The cradle 180 is made adjustable in length, and similarly each of the horseshoes 182 and 184 must be made slidable in the lateral direction to accommodate varying outer dimensions of the handset 38. Those areas of the cradle 180 or of the horseshoes 182 and 184 which come into contact with the handset 38 are made perpendicular so that nothing will impede the easy sliding of the handset 38 into its proper position over the transducers 150. For this reason and also for the additional reason that such contact surfaces should not gouge or mar the handset 38, felt 186 or some other slidable material should be fitted to the contact surfaces.

Referring to FIGURE 7, the acoustical coupler shown there has its metal base 190 resting on an insulation pad 192 of foam rubber or some other insulating material in order to minimize the effect of spurious vibration on the acoustical coupling signals between the handset transducers 152 and 154 and the electrical-acoustical transducers 150, which may be mounted as shown in FIGURE 6 upon the seats of two chairs 194 and 196, which are gimbaled at 198 to slides 200 having lock screws 202. A sensing switch 204 associated with one of the gimbaled chairs (here shown as the chair 194) is activated by the rotation of the chair 194 when the handset is placed therein, thus providing a signal usable for indicator lights and the like to show whether the handset is present or not in the acoustical coupler 36. It can be seen that the acoustical coupler of FIGURE 7 adjusts to differences between the centers of the circular faces of the transducers 152 and 154 by movement of the slides 200 and accommodates variations in the angle $\alpha$ between the planes of the faces of the transducers 152 and 154 by free rotation on the gimbals 198 of the chairs 194 and 196. Because the outer dimensions of the handset 38 may vary somewhat as well, it might be helpful to use adjusting screws 206 through the backs of the chairs 194 and 196 in order to provide a tight fit for the handset, once the slides 200 are positioned to accommodate properly the transducers 152 and 154.

Referring to FIGURE 8, the acoustical coupler shown therein features a sealed box 210 for minimizing room noise interference with acoustical coupling and can use the pad 192 to absorb mounting vibration. The chairs 194 and 196 used in the box 210 are adjustably clamped to the box rather than gimbaled as shown in FIGURE 7. Moreover, the backs of the chairs 194 and 196 are not directly opposed as shown in FIGURE 7, but rather, are mounted at some obtuse angle to each other, as for example 120° or 135°.

Referring to FIGURE 9, the acoustical couplers shown in FIGURES 6 through 8 further guard against local vibration and room noise and, additionally, transmission line echo and other electrical signal distortions by the use of a strong signal selector system 224 in the receive mode. Incoming facsimile telephone transmission line signals are transduced at 154 into sound vibrations, which are, in turn, retransduced into electrical signals in the audio range (500 c.p.s.–2,500 c.p.s.) at 150. Thereafter, an intermediate frequency signal from the source 220 is added at 222 to permit simplification of the filtering stages to follow. Beyond the adder circuit 222 is the strong signal selector system 224 (shown by the dotted block) comprising two stages 226 and 228. This strong selector system 224 corresponds to the limiter/amplifier filter 42 in FIGURE 1 and is instrumental in emphasizing the facsimile signals received at the receiver and in de-emphasizing all other signals. In this way, an accurate representation of the facsimile picture is reproduced at the receiver even though the signals representing such facsimile image are introduced to the telephone lines at the transmitter and from the telephone lines at the receiver by acoustical couplers.

The first stage 226 begins with a low-pass filter 230 to remove frequencies above that of the strong signal to be selected by the selector system 224. Following the filter 230 is an amplifier 232 which drives the filtered input signal into a hard limiter 234, the output of which is a square wave more related to the strongest component of the input signal than to the noise, echo and other spurious components thereof. The square wave from the hard limiter 234 is filtered at 236 to remove the higher harmonics therefrom. Thereafter, a pulse generator 238 provides a square wave of higher amplitude than the hard limiter 234 could produce, which after filtering at 240 and amplification at 242, emerges from the first stage 226 as a sinewave very similar to that originally imposed by the transmit-mode acoustical coupler 36 onto the transmission line 12. Further reconstruction of the original signal may be performed by the second stage 228 of the strong signal selector system 224, which has input filter 250, limiter drive amplifier 252, hard limiter 254, square wave filter 256, pulse generator 258, output filter 260, and output amplifier 262, all very similar to those discussed in connection with the first stage 226.

The output of the strong signal selector system 224 is fed into a second adder 270 which also receives as input the intermediate frequency signal from 220, but only after it has been inverted at 272 in order to be subtracted from the output of the strong signal selector system 224. Thus, the output of the adder 270 is a signal in the same audio range as that transduced at 150. This signal is fed to an equalizer 40, similar to or identical with the equalizer 34 in the transmitter. The two equalizers 34 and 40 complement each other and almost completely compensate for any distortions that may be produced by transmission over the telephone lines 12.

Figure 2:
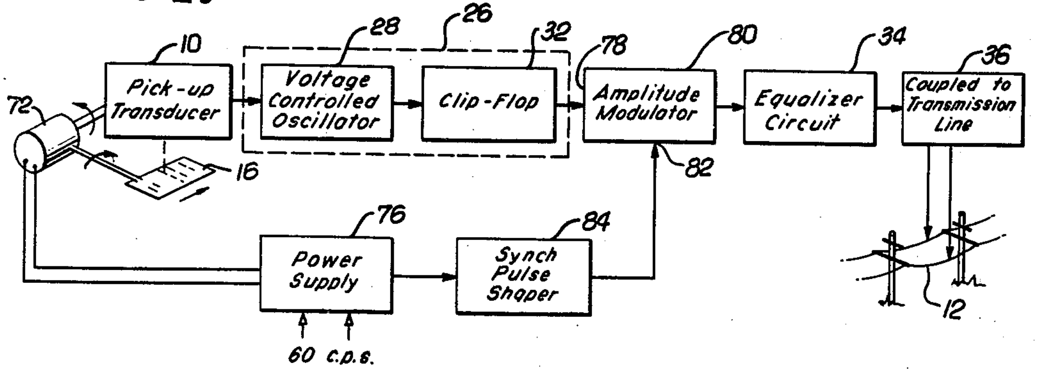
FIGURE 2 is a block diagram of the transmitting portion of another embodiment of the invention.
Figure 3:
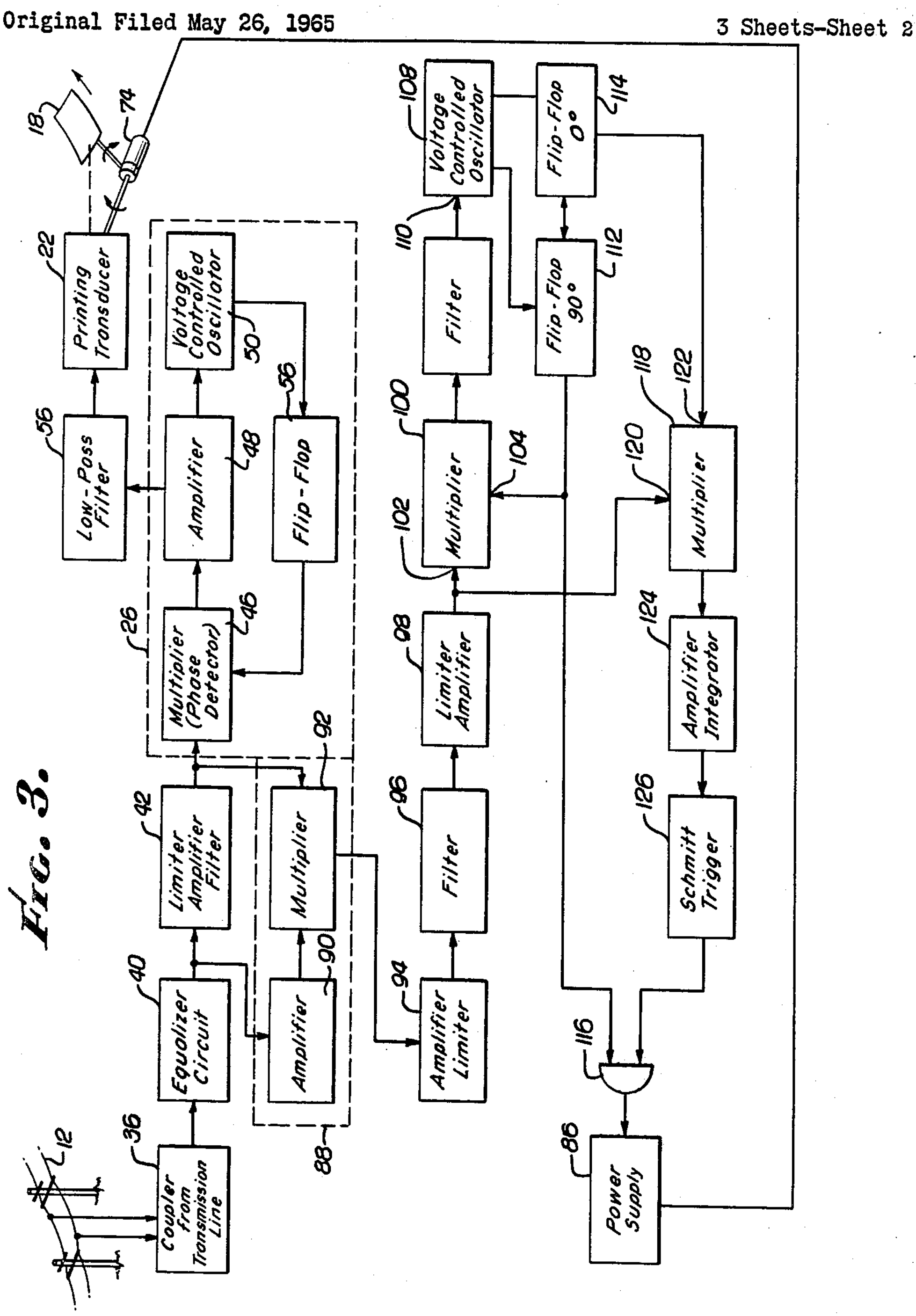
FIGURE 3 is a block diagram of the receiving portion of the facsimile system of FIGURE 2.

As an alternative, the facsimile system 70 of FIGURES 2 and 3 may be employed. This system 70 is similar to the preceding system 10. However, the driving motors 72 and 74 are not controlled by self-contained tuning forks. Instead, a synchronizing signal controls the speed of the transmitting and receiving motors whereby the two motors 72 and 74 will run synchronously with each other.

When the transceiver is operating in the transmit mode, it is arranged similar to FIGURE 2. This includes the pickup transducer 20 which scans the document to be reproduced and generates the baseband signal. This transducer 20 may be substantially identical to the corresponding transducer in the first embodiment.

The pickup transducer 20 and/or document 16 are driven by the motor 72 which may be of the synchronous variety whereby it will run at a constant speed. This motor 72 is interconnected with a power supply 76 which is driven by any suitable power source such as a commercially available power source. The power supply 76 feeds the 60-cycle power to the motor 72 so that the motor 72 will run at a speed which is precisely determined solely by the frequency of the power from the power supply 76.

The pickup transducer 20 is interconnected with the suitable frequency modulator 26 containing the voltage controlled oscillator 28 and the flip-flop 32. These may be substantially identical to the corresponding parts in the first embodiment. They are effective to frequency modulate a carrier wave with the baseband signal from the pickup transducer 20. The amplitude of this signal is substantially uniform and is free from any amplitude modulation.

The frequency modulator 26 is connected to the first input 78 to an amplitude modulator 80. This modulator 80 may be of any desired variety capable of amplitude modulating a constant amplitude signal at the first input 78 with signal present on the second input 82.

The second input 82 to the amplitude modulator 80 is interconnected with a pulse shaper 84 driven by the power supply 76. The pulse shaper 84 produces a reference signal such as a 60-cycle square wave that has a frequency equal to the signal on its input. The reference signal will thus have a constant frequency and even phase relationship to the power driving the motor 72.

It may be seen that the signal out of the amplitude modulator 80 will include a carrier which is frequency modulated by the baseband information whereby the frequency will swing over a range such as 750 to 1500 cycles per second. The signal will also include a second component which is a square wave. The square wave amplitude modulation is modulated onto the carrier wave.

An equalizer similar to the equalizer 34 may be connected to the output of the amplitude modulator to equalize the signal in accordance with the characteristics of the transmission line 12. A coupler 36 is electrically connected to the output of the equalizer 34 so as to couple the frequency-amplitude modulated signal onto the transmission line 12.

When the transceiver is operating in a receive mode, it will be arranged similar to FIGURE 3. The transceiver includes a coupler 36 which is interconnected with the transmission line 12 so as to remove the amplitude-frequency modulated signal therefrom. The coupler may be substantially identical to the coupler 36 in the first receiver. The coupler 36 is interconnected with an equalizer 40 which is effective to complement the equalizer 34 in the transmitter and thereby substantially completely equalize the received signal for any distortion which may be produced within the transmission line 12.

A limiter-amplifier-filter 42, substantially identical to the limiter-amplifier-filter 42 in the first receiver, is interconnected with the output of the equalizer 40 so as to receive the amplitude-frequency modulated signal. The limiter 42 will limit the amplitude of the signal to a substantially constant amount and thereby remove the reference signal amplitude modulated onto the original transmitted signal. The filter will restore the sidebands, particularly the upper sidebands, to the remaining frequency modulated signal.

A frequency demodulator 26 substantially the same as in the first receiver is connected to the output of the filter-limiter-amplifier 42. More particularly, this demodulator 26 includes a phase-locked loop having a multiplier phase detector 46, an amplifier 48, a voltage controlled oscillator 50 and a flip-flop 52. These are effective to demodulate the frequency modulation component from the signal and provide the baseband signal. A suitable low-pass filter 56 may be interconnected with the output of the amplifier 48 to receive the baseband signal.

The printing transducer 22 is electrically connected to the output of the low-pass filter 56 so as to receive the baseband signal. The transducer 22 is positioned to scan the copy paper 18 and make reproductions that correspond to the baseband signal.

The printing transducer 22 and/or the copy paper 18 are driven by the motor 74 so that the printing transducer 22 will scan the copy paper 18. In order to insure the motor 74 driving the printing transducer 22 in synchronism with the pickup transducer 20, the motor 74 is preferably of the so-called synchronous motor type. The motor 74 is driven from a power supply 86 that is regulated or frequency controlled by means which are effective to remove the amplitude modulated synchronizing signal from the received signal and vary the frequency of the power supply 86 so as to maintain it in a constant frequency and phase relationship with the power from the power supply 76.

In the present instance, this means includes a demodulator 88 which is effective to suppress the carrier and frequency modulated components and to leave only the amplitude modulated component. Although any suitable form of demodulator may be employed, in the present instance, an amplifier 90 is provided which is interconnected with the output of the equalizer circuit 40 and a multiplier 92 is connected to the output of the limiter-amplifier-filter 42 and to the amplifier 90.

The amplifier 90 is effective to receive a signal which includes the frequency modulated carrier with the amplitude modulated component thereon whereas the multiplier 92 receives a signal that includes the frequency modulated carrier, but is free from the amplitude modulated component. The gain and time delay of the amplifier 90 are substantially identical to the gain and time delay of the limiter-amplifier-filter 42. As a consequence, the signal transferred from the amplifier 90 to multiplier 92 will be substantially identical in amplitude and phase of the signal supplied to the multiplier 92 from the limiter-amplifier-filter 42.

The multiplier 92 is effective to multiply the two signals on its inputs so that the carrier and the frequency modulation thereon will be completely cancelled. As a result, the only signal present on the output of the multiplier 92 will be the 60 c.p.s. amplitude modulated square wave that was originally carried on the received signal.

An amplifier-limiter 94 is operatively interconnected with the output of the multiplier 92 so as to receive the amplitude demodulated 60 c.p.s. reference signal. This amplifier is effective to increase the amplitude of the signal and to limit the amplitude to a fixed amount. This will insure a square wave of substantially constant amplitude that very closely resembles the original square wave.

A filter 96 is interconnected with the output of the amplifier-limiter 94. Although this filter 96 may be of conventional design, it preferably has a series of passbands which correspond to the first, third and fifth harmonics of the power signal, i.e. 60-cycles. The filter will thereby reject or suppress the second and fourth harmonics and all harmonics above the fifth. The odd harmonics are of prime importance in determining the shape or "squareness" of a wave and the absence of even harmonics does not materially alter the squareness. However, if the even harmonics are present and phase shifted, they will produce an unsymmetrical square wave.

It should be noted that the frequency modulations will cause the frequency of the carrier to vary over a wide range. If the signals are transmitted over a telephone transmission line, there is a large amount of phase distortion and the amount of distortion varies as a function of frequency. More particularly, as the frequency increases particularly above some level such as about 2,300 c.p.s., the amount of phase shift increases. By employing the fundamental together with the upper and lower sidebands of the first, third and fifth harmonics, there will be an averaging of the shift which occurs for each harmonic. As a consequence, when the resultant square wave is reproduced, it will be substantially symmetrical.

A limiter-amplifier 98 is interconnected with the output of the filter 96 for again amplifying the reconstituted square wave. The wave also has its amplitude limited to further increase its "squareness" and improve the phase relationship.

A multiplier 100 is provided which has the first input 102 thereof connected to the output of the limiter-amplifier 98 so as to receive the square wave. This multiplier 102 is effective to multiply the signal on the first input 102 with the signal on the second input 104 and produce a product signal on the output.

A filter 106 is interconnected with the output of the multiplier 100. This filter 106 has a passband which is symmetrically disposed about the frequency of the reference wave, i.e. 60 c.p.s. During normal operation, the bandwidth of this filter 106 may be on the order of 60 cycles plus or minus one-tenth of a cycle per second. However, if synchronizing means such as disclosed and claimed in copending application, Ser. No. 520,269, filed Jan. 12, 1966, in the names of Glenn A. Reese and Paul J. Crane are employed, the bandwith may be expanded to plus or minus 2 c.p.s. during the initial synchronizing interval and then returned to plus or minus 0.1 c.p.s.

A voltage controlled oscillator 108 is interconnected with the filter 106. This oscillator 108 may run at an idle frequency such as 120 c.p.s. when there is no signal on the input 110. However, when there is a signal on the input 110, the frequency will be determined by the amplitude of the signal. As a result, the frequency at which the oscillator 108 is running may be "pulled" above or below the idle frequency by some predetermined amount.

A pair of flip-flops 112 and 114 are interconnected with the output of the voltage controlled oscillator 108. These flip-flops switch each time a cycle occurs from the output of the oscillator 108 whereby they will count down by one-half and produce an output signal which is 60-cycles. The first flip-flop 112 produces a signal which is 90° out-of-phase while the second flip-flop 114 produces a signal which is in phase.

The output of the first flip-flop 112 is interconnected with the second input 104 to the multiplier 100 so as to supply the out-of-phase 60-cycles per signal thereto. If the signals from the flip-flop 112 and the limiter-amplifier 98 are precisely 90° out-of-phase with each other, there will be a zero signal from the multiplier 100. However, if the signals are phase displaced from each other, the output of the multiplier 100 will be positive or negative depending upon whether the signal from the flip-flop 112 is leading or lagging the synchronized signal from the limiter-amplifier 98. This positive or negative signal will pass through the filter 106 and be effective to control the bias on the voltage controlled oscillator 108.

This bias voltage will control the frequency at which the oscillator 108 is running and will shift the frequency by just a sufficient amount to make the two signals 90° out-of-phase.

It will thus be seen that the signals from the two flip-flops 112 and 114 will be very precisely phase locked to the 60 c.p.s. reference signal on the carrier wave. The power supply 86 is interconnected with the output of the flip-flop 112 so as to receive the 60-cycle signal therefrom. The power supply 86 will be controlled by the 60-cycle signal and produce sufficient power to run the motor 74. It will thus be seen that the motor 74 will run at an identical speed with the motor 72 in the transmitting unit.

It has been found that since the oscillator 108 will idle at about 120 c.p.s., if no signal is received or there is no synchronized signal on the carrier, there will be no voltage applied to the voltage controlled oscillator 108. As a consequence, this oscillator 108 will tend to drive the two flip-flops 112. These in turn, will drive the power supply 86 and cause the motor 74 to run.

In the event that it is desiced to eliminate the possibility of the motor 74 running when there is no signal being received or when the synchronized signal is not present, an AND gate 106 may be employed to interconnect the flip-flop 112 with the power supply 86. This AND gate 106 is actuated by means which are responsive to the absence of the synchronized signal or the presence of a false signal. In the present instance, this means includes the second flip-flop 114 interconnected with the voltage controlled oscillator 108.

This flip-flop 114 operates at right angles to the first flip-flop 112 so as to produce the in-phase signal. A second multiplier 118 has one input 120 interconnected with the limiter 98 to receive the 60 c.p.s. reference square wave. The other input 122 is connected to the output from the second flip-flop 114 so as to receive the in-phase signal. It will thus be seen that this multiplier 118 will be responsive to the square wave from the flip-flop 114 and whatever signal is present from the limiter-amplifier 98.

In the event that there is no signal from the limiter-amplifier 98 or that the signal consists of random scattered noise pulses, etc., the output from the multiplier 118 will consist of a square wave substantially identical to the square wave from the flip-flop 114. As a consequence, this signal will have an average value which is on the order of one-half of the amplitude of the flip-flop signal.

If the reference square wave is received and the previously described phase-lock loop is operating properly, the two signals will be exactly in phase with each other. Under these circumstances, the multiplier 118 will be effective to multiply the two signals together and produce an output signal having an amplitude substantially equal to the amplitude of the signal from the flip-flop 114. It will thus be seen that the signal from the multiplier 118 will be at the first level when there is no synchronized signal present and will be at the second level when a synchronized signal is present and the flip-flop 112 is running in a precise phase-lock relation. This will thus provide an unambiguous indication of the presence or absence of the original synchronized signal.

An amplifier-integrator 124 may be interconnected with the output of the multiplier 118 so as to amplify the signal to a more useful level. The integrator portion of this amplifier 124 may have a time constant on the order of one or two seconds or even longer so that the level of the signal from the multiplier 118 must shift from one level to the other level and remain there for an extended period of time before the signal from the amplifier 124 will shift to the same level. Thus, if a short burst of noise, etc. momentarily switches the level of the output of multiplier 118 from the first to the second level, the amplifier-integrator 124 will not switch.

A Schmitt trigger 126 is interconnected with the amplifier-integrator 124 and is responsive to the signal therefrom. When the integrator 124 is at the first level, the Schmitt trigger 126 will be shut off. However, when the signal switches to the second level, the Schmitt trigger 126 will switch its state. The Schmitt trigger 126 is, in turn, interconnected with the second input to the AND gate 116 and will open the AND gate 116 and allow the passage of the synchronized signal when the phase-lock loop is operating properly.

It may thus be seen a facsimile system has been provided that is capable of transmitting a video or facsimile signal over a narrow-band telephone transmission line together with a synchronizing signal to synchronize the operation of the trnsmitting and receiving units.

While only one embodiment of the present invention is disclosed and described herein, it will be readily apparent to persons skilled in the art that numerous changes and modifications may be made thereto without departing from the spirit of the invention. Accordingly, the foregoing disclosure, including the drawings and description thereof, are for illustrative purposes only and do not in any way limit the invention which is defined only by the claims which follow.

What is claimed is:

1. A facsimile system for producing a copy of an original document at a distance from the facsimile system by utilizing commercial telephone transmission facilities, including:

reading means for producing an electrical signal having amplitude characteristics representative of the contents of the original document;

means electrically connected to the reading means for frequency modulating the electrical signal from the reading means to produce an electrical signal having rectangular characteristics and having audio frequencies in a particular range;

sending means electrically connected to the frequency modulating means for passing the frequency modulated signal with rectangular characteristics into the commercial telephone transmission facilities;

receiving means remotely located from the sending means for receiving the frequency modulated signals with the rectangular characteristics from the commercial telephone transmission facilities;

means electrically connected to the receiving means for emphasizing the rectangular characteristics of the frequency modulated signals relative to other signals in the commercial telephone transmission facilities;

means electrically connected to the emphasizing means for demodulating the frequency-modulated electrical signals received by the receiving means from the commercial telephone transmission facilities to produce an electrical signal having amplitude characteristics corresponding to the amplitude characteristics of the signal representative of the contents of the document; and means electrically connected to the demodulating means for reproducing the contents of the original document in response to the amplitude characteristics of the electrical signal from the demodulating means.

2. The system set forth in claim 1 wherein the emphasizing means includes means for passing signals only in the particular range of audio frequencies.

3. A facsimile system for producing a copy of an original document at a distance from the facsimile system by utilizing commercial telephone transmission facilities, including:

means for scanning the original document and producing an electrical signal having amplitude characteristics representative of the contents of the document;

means electrically connected to the scanning means for frequency modulating the electrical signal from the scanning means to produce an electrical signal having rectangular characteristics and having a particular range of audio frequencies;

sending means including a first acoustical coupler electrically connected to the frequency modulating means for passing the frequency modulated signal with the rectangular characteristics from the frequency modulating means into the commercial telephone transmission facilities;

receiving means remotely located from the sending means and including a second acoustical coupler for receiving the frequency modulated signals with the rectangular characteristics from the commercial telephone transmission facilities;

means at the receiving means for emphasizing the rectangular characteristics of the frequency modulations in the frequency modulated signals to reduce the effects of any noise resulting from other signals in the standard commercial telephone transmission facilities;

means electrically connected to the emphasizing means for demodulating the frequency-modulated electrical signals received by the receiving means from the standard commercial telephone transmission facilities in accordance with the rectangular characteristics of the signals to produce an electrical signal having amplitude characteristics corresponding to the amplitude characteristics of the electrical signal produced by the scanning means; and means electrically connected to the demodulating means for scanning a blank piece of copy paper and printing thereon in response to the amplitude characteristics of the signal from the demodulating means.

4. The facsimile system set forth in claim 3 wherein means are included in the emphasizing means for passing only signals in the particular range of audio frequencies.

5. A facsimile system for producing a copy of an original document at a distance from the facsimile system by utilizing commercial telephone transmission facilities having a certain frequency passband, comprising:

means for scanning the original document and producing an electrical signal having amplitude characteristics representative of the contents of the document;

means electrically connected to the scanning means for frequency modulating the electrical signal from the scanning means to produce a frequency-modulated signal having a carrier frequency and sidebands within the passband of the telephone transmission facilities and having rectangular characteristics and having a particular range of audio frequencies;

sending means electrically connected to the frequency modulating means for passing the frequency modulated signal with the rectangular characteristics into the commercial telephone transmission facilities;

receiving means remotely located from the sending means for receiving frequency modualted signals with the rectangular characteristics from the commercial telephone transmission facilities;

means including at least one filter, amplifier and limiter connected to the receiving means and to one another for emphasizing the rectangular characteristics of the frequency modulated signals in the particular range of audio frequencies relative to other signals in the commercial telephone transmission facilities;

means electrically connected to the emphasizing means for demodulating the frequency-modulated electrical signals with the rectangular characteristics to produce an electrical signal having amplitude characteristics corresponding to the amplitude characteristics of the signal produced by the scanning means; and means electrically connected to the demodulating means for scanning a blank piece of copy paper and printing on the blank piece of copy paper in response to the amplitude characteristics of the signal produced by the demodulating means.

6. A facsimile system for producing a copy of an original document at a distance from the facsimile system by utilizing commercial telephone transmission facilities, comprising:

means for scanning the original document and producing an electrical signal having amplitude characteristics representative of the contents of the document;

means electrically connected to the scanning means for frequency modulating the electrical signal from the scanning means to produce a signal with rectangular characteristics;

means electrically connected to the frequency modulating means for imposing synchronizing signals upon the frequency modulated signal;

sending means electrically connected to the synchronizing signal means for passing the output from the synchronizing signal means into the commercial telephone transmission facilities;

receiving means remotely located from the sending means for receiving the frequency modulated signals from the commercial telephone transmission facilities;

means electrically connected to the receiving means for separating the synchronizing signals from the frequency modulated signals;

means coupled to the receiving means for emphasizing the rectangular characteristics of the frequency modulated signals relative to other signals in the commercial telephone transmission facilities;

means coupled to the last mentioned means for demodulating the frequency-modulated electrical signals with the rectangular characteristics from the emphasizing means to produce an electrical signal having amplitude characteristics corresponding to the amplitude characteristics of the signal produced by the scanning means;

printing means electrically connected to the demodulating means for scanning a blank piece of copy paper and printing thereon in response to the amplitude characteristics of the signal from the demodulating means; and synchronizing means electrically coupled to receive the electrical synchronizing signals from the separating means and to use the electrical synchronizing signals for accurately controlling the printing means.

7. A facsimile system for producing a copy of an original document at a distance from the facsimile system by utilizing commercial telephone transmission facilities including first and second telephone handsets, comprising:

means for scanning the original document and producing an electrical signal having amplitude characteristics representative of the contents of the document;

means electrically connected to the scanning means for frequency modulating the electrical signal from the scanning means to provide a signal with rectangular characteristics and having a particular range of audio frequencies;

transmitter-transducer means electrically coupled to the frequency modulating means for converting the frequency modulated signal with the rectangular characteristics from the frequency modulated means to an acoustical signal having characteristics corresponding to the frequency modulated signal;

first acoustical coupling means for acoustically coupling the acoustical signal into the first telephone handset for transmission through the commercial telephone transmission facilities to the second telephone handset;

a receiver-transducer constructed to derive the frequency-modulated electrical signal with the rectangular characteristics from the acoustically coupled signal;

second acoustical coupling means for acoustically coupling into the receiver-transducer the signal received at the second telephone handset;

means including a filter, amplifier and limiter coupled to the receiver-transducer and to one another for emphasizing the rectangular characteristics of the frequency modulated signal in the particular range of audio frequencies relative to other signals in the commercial telephone transmission facilities to derive the frequency modulated signal with the rectangular characteristics from such other signals;

means electrically connected to the last mentioned means for demodulating the frequency-modulated electrical signals to produce a signal having amplitude characteristics of the signal produced by the scanning means; and means electrically connected to the demodulating means for scanning a blank piece of copy paper and printing on the paper in response to the amplitude characteristics of the signal from the demodulating means.

8. A facsimile system for producing a copy of an original document at a distance from the facsimile system by utilizing commercial telephone transmission facilities, comprising:

reading means for producing an electrical signal having amplitude characteristics representative of the contents of the original document;

means electrically connected to the reading means for frequency modulating the electrical signal from the reading means to produce a signal with rectangular characteristics and with a particular range of audio frequencies;

sending means including a first acoustical coupler electrically connected to the frequency modulating means for passing the frequency modulated signal with the rectangular characteristics into the commercial telephone transmission facilities;

receiving means including a second acoustical coupler remotely located from the sending means for receiving the frequency-modulated signals with the rectangular characteristics from the commercial telephone transmission facilities;

means responsive to the frequency modulated signals received by the receiving means for operating upon such signals to emphasize the rectangular characteristics of such frequency modulations in relation to noise and other signals received by the receiving means from the telephone lines and the vicinity surrounding the receiving means to recover the frequency modulated signals with the rectangular characteristics from the noise and other signals;

means electrically connected to the last mentioned means for demodulating the frequency-modulated electrical signals received by the receiving means from the commercial telephone transmission facilities to produce a signal having amplitude characteristics corresponding to the amplitude characteristics of the signal produced by the reading means; and means electrically connected to the demodulating means for reproducing the contents of the original document in response to the amplitude characteristics of the signal for the demodulating means.

9. The facsimile system as set forth in claim 8 wherein means are included in the emphasizing means for passing signals only in the particular range of audio frequencies.

10. A facsimile system for producing a copy of an original document at a distance from the facsimile system by utilizing commercial telephone transmission facilities having a particular frequency passband in the audio frequency range, the commercial telephone transmission facilities including first and second commercial handsets and commercial telephone lines between the first and second handsets, including:

means for scanning the original document and producing an electrical signal having amplitude characteristics representative of the contents of the document;

means electrically connected to the scanning means for frequency modulating the electrical signals from the scanning means to produce a frequency-modulated signal having a carrier frequency and sidebands within the particular frequency passband and having rectangular characteristics;

means electrically connected to the frequency modulating means for modifying the frequency modulated signal with the rectangular characteristics from the frequency modulating means to partially compensate for distortion defects characteristic of the commercial telephone facilities;

transmitter-transducer means electrically coupled to the modifying means for converting the frequency modulated signal from the distortion compensating means to an acoustical signal with characteristics corresponding to the frequency modulated signals;

means for acoustically coupling the acoustical signal into the first standard telephone handset for transmission through the commercial telephone lines to the second standard telephone handset;

a receiver-transducer constructed to derive a frequency-modulated electrical signals from the acoustically coupled signal;

means associated with the transmitter-transducer means for acoustically coupling the signal received at the second standard telephone handset into the receiver-transducer;

means coupled to the receiver-transducer and including at least one filter, amplifier and limiter connected to one another for compensating the frequency modulated electrical signals for distortion occurring in its transmission through the commercial telephone facilities and for emphasizing the rectangular characteristics of the frequency modulated electrical signal in the particular frequency passband;

means electrically connected to the last mentioned means for demodulating the frequency-modulated electrical signals to produce an electrical signal having amplitude characteristics corresponding to the amplitude characteristics of the signal produced by the scanning means; and means electrically connected to the demodulating means for scanning a blank piece of copy paper and printing on the paper in response to the amplitude characteristics of the signal from the demodulating means.

11. A facsimile system for producing a copy of an original document at a distance from the facsimile system by utilizing commercial telephone transmission facilities, including:

reading means for producing an electrical signal having amplitude characteristics representative of the contents of the original document;

means electrically connected to the reading means for frequency modulating the electrical signal from the reading means to produce a signal with rectangular characteristics and with audio frequencies in a particular range;

sending means including a first acoustical coupler electrically connected to the frequency modulating means for passing the frequency modulated signal with the rectangular characteristics into the commercial telephone transmission facilities;

receiving means including a second acoustical coupler remotely located from the sending means for receiving the frequency-modulated signals with the rectangular characteristics from the commercial telephone transmission facilities;

means including filtering and amplitude-limiting means for filtering signals having frequencies different from the audio frequencies in the particular range and for limiting the amplitude of the frequency modulated signals received by the receiving means to derive substantially only the rectangular characteristics of the frequency modulated signals representing the facsimile information;

means electrically connected to the last mentioned means for demodulating the frequency-modulated electrical signals with the electrical characteristics to produce a signal having amplitude characteristics corresponding to the amplitude characteristics of the signal produced by the reading means; and means electrically connected to the demodulating means for reproducing the contents of the original document in response to the amplitude characteristics of the signal from the demodulating means.

12. In combination for use with signals frequency modulated with rectangular characteristics in a particular range of audio frequencies to represent a facsimile image and transmitted through telephone lines, where noise and other signals are also transmitted through the telephone lines:

an acoustical coupler acoustically coupled to the telephone lines;

means including the acoustical coupler for reproducing the frequency modulated signals with the rectangular characteristics;

means responsive to the frequency modulated signals received by the receiving means for operating upon such signals to emphasize the rectangular characteristics of such frequency modulations in relation to noise and other signals received by the receiving means from the telephone lines and the vicinity surrounding the receiving means;

means operatively coupled to the last-mentioned means for operating upon the frequency demodulated signals with the rectangular characteristics from the last-mentioned means to produce signals having amplitude characteristics in accordance with the frequency characteristics of the frequency modulated signals; and means operatively coupled to the last-mentioned means for producing a visual image having characteristics in accordance with the amplitude characteristics of the signals from the last-mentioned means.

13. The combination set forth in claim 12 wherein the emphasizing means includes further means for passing only the signals in the particular range of audio frequencies.

14. In combination for use with signals frequency modulated in a particular range of audio frequencies with rectangular characteristics to represent a facsimile image and transmitted through telephone lines, where noise and other signals are also transmitted through the telephone lines:

an acoustical coupler acoustically coupled to the telephone lines to receive the transmitted signals;

first means including the acoustical coupler for producing the frequency modulated signals;

second means including filtering and limiting means connected to the first means for filtering signals having frequencies different from the audio frequencies in the particular range and for limiting the amplitude of the filtered signals by the receiving means to derive substantially only the frequency modulated signals representing the facsimile information and to emphasize the rectangular characteristics of such signals;

means operatively coupled to the last-mentioned means for operating upon the frequency modulated signals with the rectangular characteristics from the last-mentioned means to produce signals having amplitude characteristics in accordance with the frequency characteristics of the frequency modulated signals; and means operatively coupled to the last-mentioned means for producing a visual image having characteristics in accordance with the amplitude characteristics of the signals from the last-mentioned means:

15. The combination set forth in claim 14 wherein the filtering means are connected to the first means, amplifier means are connected to the filtering means to amplify the signals passed by the filtering means and the limiting means are connected to the amplifying means to limit the amplitude of the amplified signals.

16. In combination for use with signals frequency modulated in a particular range of audio frequencies with rectangular characteristics to represent a facsimile image and transmitted through telephone lines, where noise and other signals are also transmitted through the telephone lines;

an acoustical coupler acoustically coupled to the telephone lines to receive the transmitted signals;

means including the acoustical coupler for reproducing the frequency modulated signals;

filter means responsive to the frequency modulated signals received by the receiving means for passing signals in substantially only the particular range of audio frequencies of the frequency modulated signals;

amplifying and limiting means for amplifying and limiting the amplitude of the signals passed by the filter means to convert the signals from the filter means into substantially only the frequency modulated signals and to emphasize the rectangular characteristics of such signals;

means operatively coupled to the last-mentioned means for operating upon the frequency modulated signals from the last-mentioned means to produce signals having amplitude characteristics in accordance with the frequency characteristics of the frequency modulated signals; and means operatively coupled to the last-mentioned means for producing a visual image having characteristics in accordance with the amplitude characteristics of the signals from the last-mentioned means.

17. The combination set forth in claim 16 wherein a plurality of filter means and amplifying and limiting means are connected in a cascade relationship.

References Cited

UNITED STATES PATENTS

| | | | |
|---|---|---|---|
| 2,903,517 | 9/1959 | Ridings | 179—4 |
| 3,229,033 | 1/1966 | Artzt | 178—6.6 |
| 3,347,987 | 10/1967 | Chaloupka. | |
| 3,350,637 | 10/1967 | Pochtar | 328—28 X |

RALPH D. BLAKESLEE, Primary Examiner

U.S. Cl. X.R.

178—6.6, 68